United States Patent

Schwarze et al.

[11] Patent Number: 6,070,290
[45] Date of Patent: Jun. 6, 2000

[54] HIGH MANEUVERABILITY RIDING TURF SWEEPER AND SURFACE CLEANING APPARATUS

[75] Inventors: Mark Robert Schwarze; Jim Edward Adair; Anthony C. Libhart, all of Huntsville, Ala.

[73] Assignee: Schwarze Industries, Inc., Huntsville, Ala.

[21] Appl. No.: 09/085,234

[22] Filed: May 27, 1998

Related U.S. Application Data

[60] Provisional application No. 60/047,761, May 27, 1997.

[51] Int. Cl.[7] ................................. A47L 5/00; A47L 5/14
[52] U.S. Cl. ........................... 15/340.1; 15/340.4; 15/346
[58] Field of Search ................. 15/340.1, 340.3, 15/340.4, 345, 346, 349

[56] References Cited

U.S. PATENT DOCUMENTS

| | | | |
|---|---|---|---|
| 514,678 | 2/1894 | Furnas | 15/346 |
| 3,634,904 | 1/1972 | Larsen | 15/340.3 |
| 3,808,632 | 5/1974 | Aagesen | 15/340.1 |
| 3,824,771 | 7/1974 | Williams | 15/340.1 |
| 4,044,422 | 8/1977 | Larsen | 15/346 |
| 4,193,159 | 3/1980 | Beard, III | 15/340.1 |
| 5,093,955 | 3/1992 | Blehert et al. | 15/349 |
| 5,287,684 | 2/1994 | Beroth | 15/340.1 |
| 5,519,915 | 5/1996 | Hollowell | 15/340.1 |
| 5,596,788 | 1/1997 | Linville et al. | 5/346 |

*Primary Examiner*—Robert J. Warden, Sr.
*Assistant Examiner*—Andrew Aldag
*Attorney, Agent, or Firm*—Wallace G. Walter

[57] ABSTRACT

A high maneuverability riding turf sweeper (8) includes a debris-intake hood (13) that is mounted forwardly of a wheeled chassis (41) upon which the major components, including an engine (42) and a hydraulic pump (27) for powering the sweeper (8) are mounted. A radial-flow fan assembly (10) creates an air recirculation loop by which debris picked-up by the debris-intake hopper (13) is deposited into a debris-containment hopper (43). The hopper (43) is pivotally mounted adjacent its upper end and its contents can be dumped by raising the hopper (43) about its pivot (49) to provide an efficient high-dump capability.

14 Claims, 4 Drawing Sheets

HIGH MANEUVERABILITY RIDING TURF SWEEPER AND SURFACE CLEANING APPARATUS

CROSS REFERENCE TO RELATED APPLICATIONS

The present application claims domestic priority to U.S. Provisional Patent Application Ser. No. 60/047,761 filed May 27, 1997, the disclosure of which is incorporated herein by reference.

BACKGROUND OF THE INVENTION

The present invention relates to high maneuverability sweeping vehicles suitable for use for "sweeping" turf and similar surfaces including parking lots and pavements.

Sweeping machines of the type used to remove dust and debris from municipal streets, i.e., pavement sweepers, typically include a wheeled chassis having forward and rearwardly placed wheels with a vacuum intake hood suspended from the chassis between the wheels and aligned in a direction transverse to the direction of travel of the chassis. Additionally, rotatable circular brooms are often provided to engage the pavement at the intersection of the pavement and the curbstone, i.e., the gutter. Sweepers of this general type are well-suited for straight-line removal of dust and debris.

Where it is desired to remove debris from grassy areas having undulating surfaces and curvilinear boundaries, i.e., golf courses and other areas with highly maintained grass, sweepers of the general design discussed above are not sufficiently maneuverable to function well and are especially not well-suited for following curving boundaries and undulating edge areas.

SUMMARY OF THE INVENTION

In view of the above, it is an object of the present invention, among others, to provide a riding turf sweeper that is highly maneuverable.

It is another object of the present invention to provide a high maneuverability riding turf sweeper and surface cleaning apparatus in which the debris intake is mounted forwardly of the front wheels to provide maximum operator visibility.

It is still another object of the present invention to provide a high maneuverability riding turf sweeper which can quickly and easily unload accumulated debris and dust.

It is a further object of the present invention to provide a high maneuverability riding turf sweeper and surface cleaning apparatus having a desirable "high-dump" capability.

In view of these objects, and others, the present invention provides a high maneuverability riding turf sweeper and surface cleaning apparatus in which the vacuum intake hood is mounted forwardly of the front drive wheels of the vehicle to provide maximum maneuverability and visibility for the operator. The front wheels are powered with steering achieved by braking one of the wheels to provide zero radius turns. The rear of the vehicle is provided with a self-steering caster-type wheel to facilitate the small-radius turning of the vehicle.

The present invention advantageously provides a high maneuverability riding turf sweeper well suited for sweeping undulating and curving boundaries often associated with golf courses and other areas with highly maintained grass.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
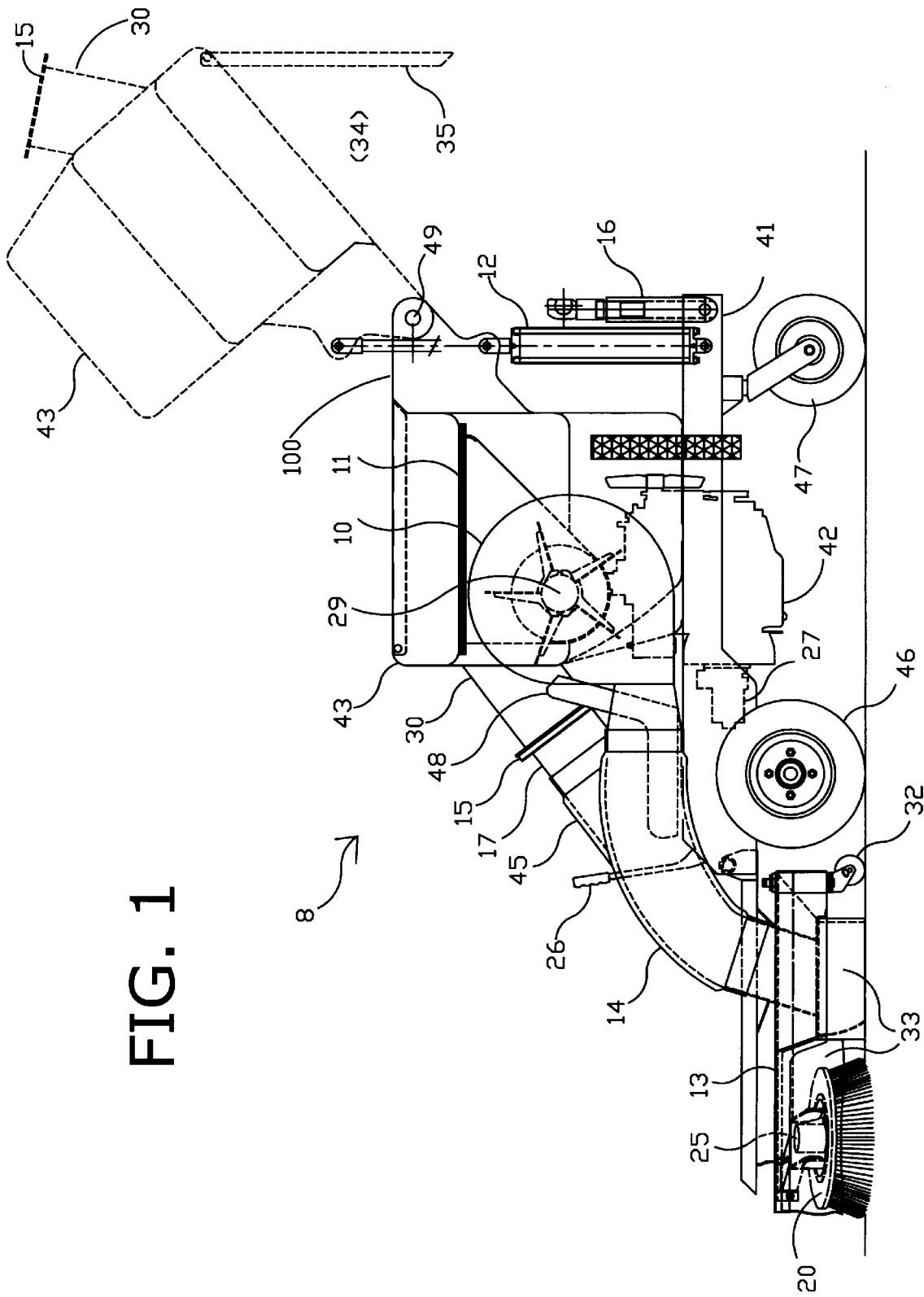
FIG. 1 is a left side view of the organization of the major components of the high maneuverability riding turf sweeper and surface cleaning apparatus in accordance with the present invention.

A high maneuverability riding turf sweeper and surface cleaning apparatus in accordance with the present invention is shown in FIG. 1 and designated generally therein by the reference character 8. As shown, the sweeper 8 includes a chassis 41 upon which the major components are mounted. An internal combustion engine 42 (i.e., gasoline, diesel, etc.) is mounted on the chassis 41 and is coupled to and drives a hydraulic pump 27 that provides pressurized hydraulic fluid through various pipes and conduits to various hydraulic motors and cylinders (not specifically shown). A housing 28 (FIG. 3) contains the hydraulic reservoir, hydraulic filter, air filters, air pump, ducting, and electrical circuitry.

Figure 2:
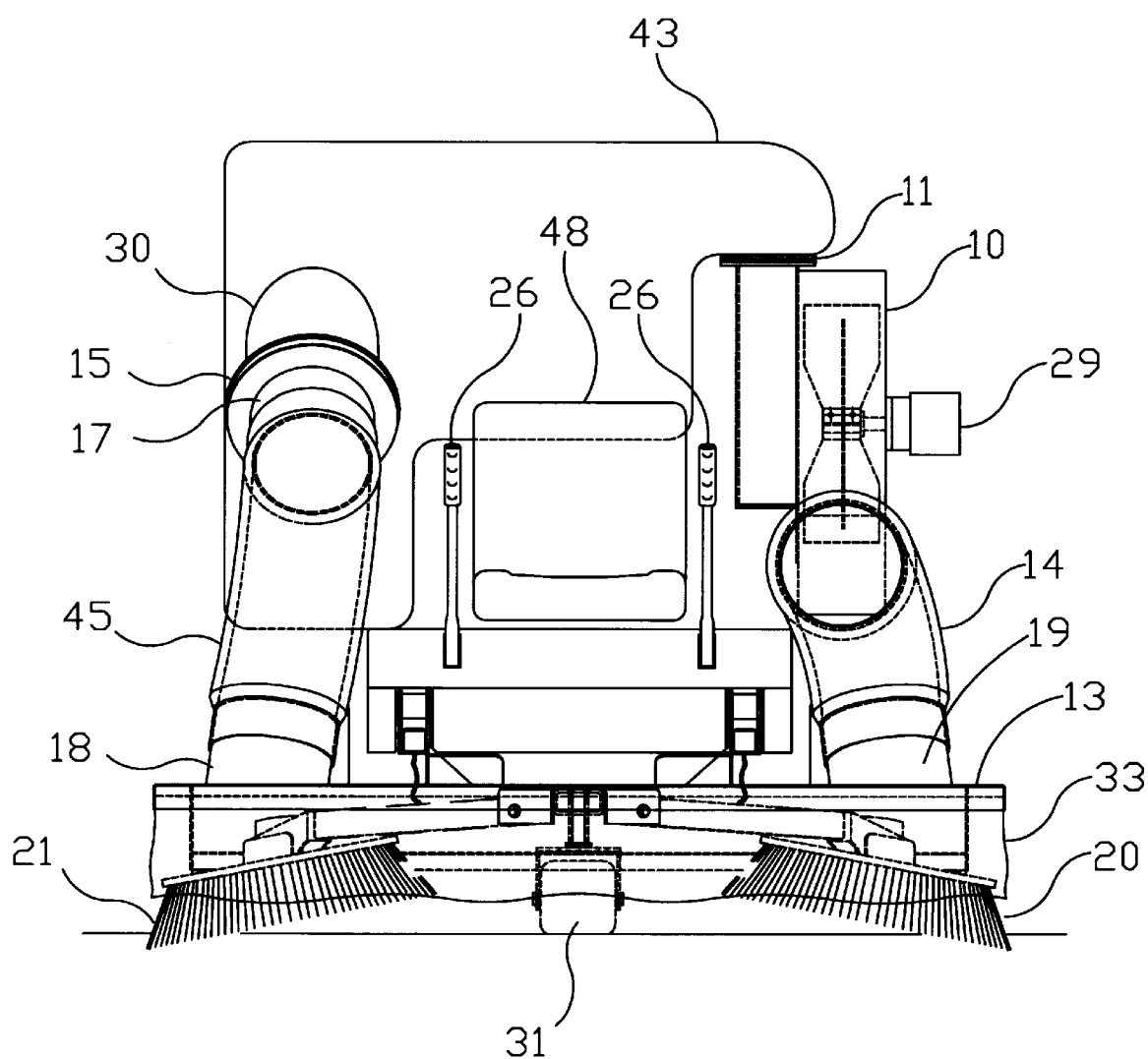
FIG. 2 is a front view of the sweeper shown in FIG. 1.
Figure 3:
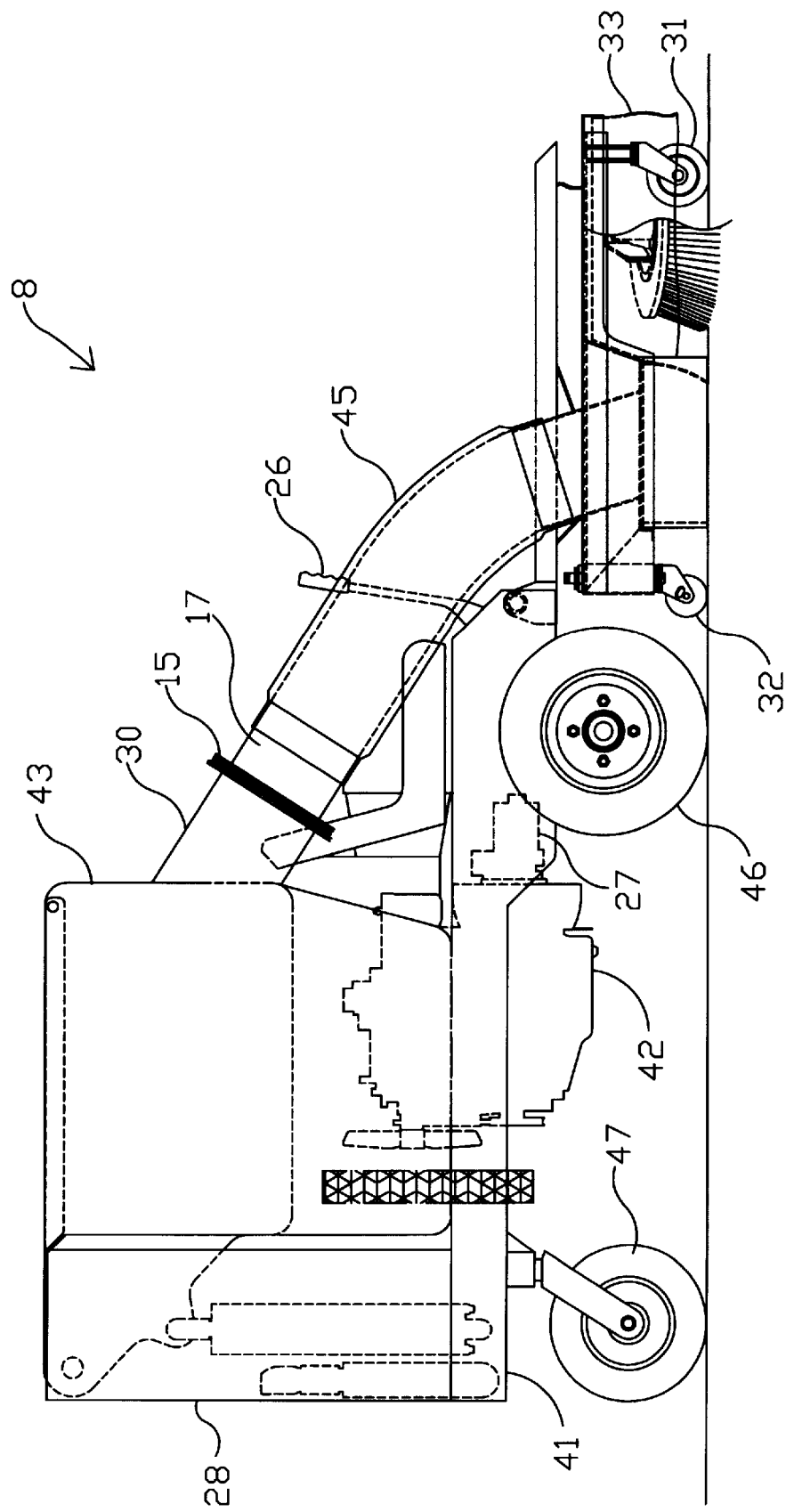
FIG. 3 is a right side view of the sweeper illustrated in FIG. 1.
Figure 4:
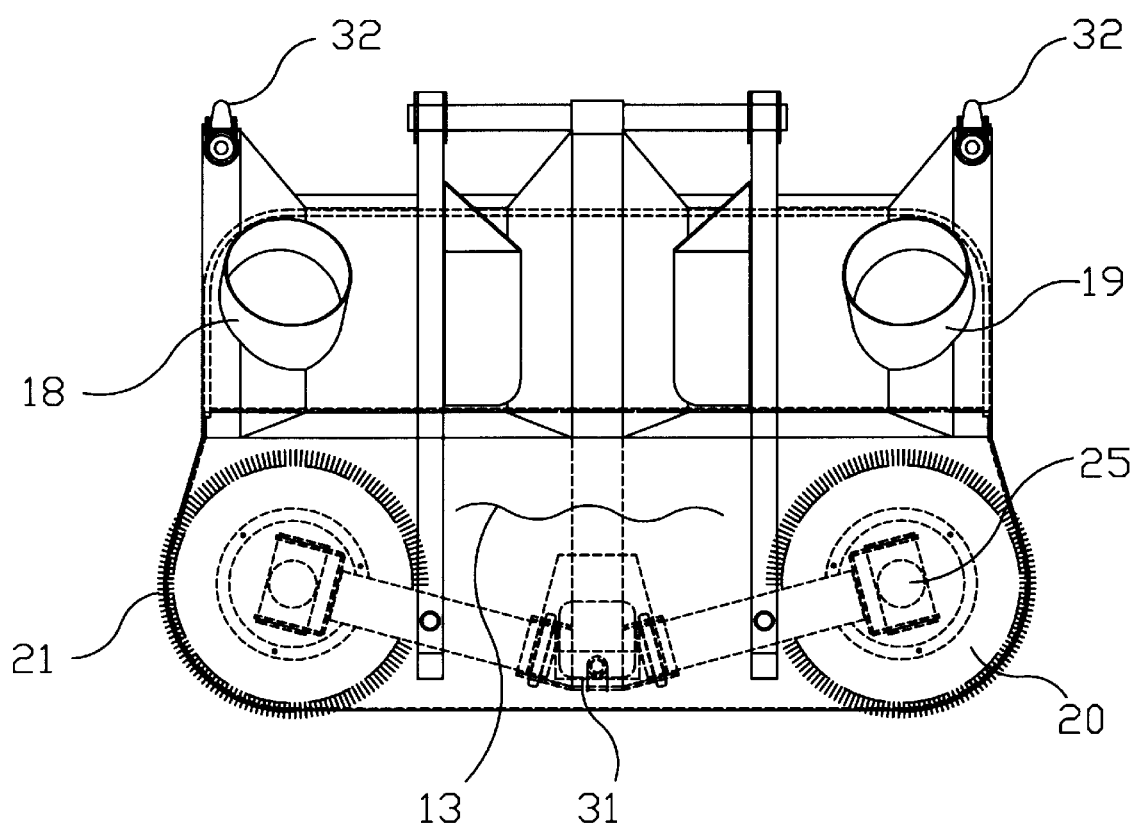
FIG. 4 is a top view of the vacuum intake hood of the sweeper of FIGS. 1–3.

The sweeper 8 uses an air recirculation system to pick up debris. In these types of systems, a closed air-flow loop is established by a fan which provides reduced-pressure suction and pressurized air flows. As shown in FIGS. 1, 3, and 4, a radial-flow fan assembly 10 (which includes a fan and its containment scroll) is driven by a hydraulic motor 29 and creates air suction at its inlet and pressurized air at its outlet by centrifugal action. A debris-containment hopper 43 is mounted on the chassis 41 behind a driver's seat 48. As best seen in FIG. 2, the air intake of the fan assembly 10 it connected to the hopper 43 through a disengageable seal interface 11. The outlet of the fan assembly is connected to a pressure-side tube 14, which in turn, is connected to the pressure-side inlet 19 of a forwardly mounted debris-intake hopper 13. Air is sucked from hopper 43 by the fan assembly 10 through the seal interface 11 causing a corresponding suction, or partial vacuum, in a suction-side hose 45. The suction-side hose 45 is connected between the debris-intake hood 13 via the suction-side outlet 13 of the hood 13, a tube 17 and a hopper inlet tube 30 through a disengageable seal interface 15. Debris from the underlying turf or to-be-swept surface is sucked through the outlet tube 18 of the debris-intake hood 13 and through the tube 17, the seal interface 15, and the hopper inlet tube 30 into the hopper 43. Concurrently, pressurized air exiting the fan assembly 10 is directed through a pressure-side tube 14 and through the pressure-side inlet 19 of the intake hood 13 to push debris transversely (from the right to the left in FIG. 2) across and into the suction-side outlet tube 18. Debris sucked up through the tube 17, through the seal interface 15, and through the hopper inlet tube 30 is delivered into the debris-receiving hopper 43. As the debris-laden air enters the hopper 43, the air decelerates to a velocity at which the entrained debris falls out of the air stream and is captured in and contained in the interior of the hopper 43. Air is drawn from the upper area of the hopper 43 and passes through the seal 11 where it is again accelerated and enters the fan assembly 10 where it is pressurized and the air-recirculation cycle repeated. If desired, the air stream can be made to pass through one or more screens or filters located within the hopper 43 to insure removal of fine particles (i.e., "fines").

As shown in FIGS. 1 and 2, the front drive wheels 46 are hydraulically driven and receive hydraulic power from pump 27 with their rotational speed and direction controlled by the operator, who rides on the seat 48 located above the front wheel axis and forwardly of the hopper 43. A stick-controller 26 is located on each side of the seat 48 for steering control. The sweeper 8 can be controlled so that the machine can pivot about either of the drive wheels 46 or pivot about any point along a line between the two front drive wheels 46 by using one the the stick-controllers 26 to brake one wheel with the other wheel causing the machine to rotate or turn. The specific connection between the stick-controllers 26 and the drive wheels 46 and/or their drive motors is conventional and is not shown.

A swiveling (i.e., self-steering) caster wheel 47 is mounted at the rear of the sweeper 8 on the longitudinal center of the sweeper 8 and supports the weight of the rear portion or the machine.

As shown in FIGS. 1 and 3, the debris-intake hood 13 is positioned ahead or forwardly of the drive wheels 46 so that the operator can view the debris-intake hood 13 at all times and steer the sweeper 8 around, away from, up against, or over objects on the surface being swept. This particular organization is particularly desirable when sweeping along the edge of a curving or undulating border or boundary.

Full floating rotary brooms 20 and 21 are located at the front left and front right corners, respectively, of the debris-intake hood 13. Hydraulic broom motors 25 drive each broom with power provided by the hydraulic system via hydraulic pump 27 through various conduits (not shown). The brooms 20 and 21 are dual plane adjustable so that, as they touch the surface, any debris that comes into contact with their respective bristles is swept toward and to the central region of the sweeper 8 for removal by the debris-intake hood 13. The brooms 20 and 21 can be raised off the surface being swept without raising the debris-intake hood 13 to provide sufficient clearance to allow debris to be swept using the air stream as described above. The debris-intake hood 13 is supported by three swivel type casters; a front caster 31 is located at the front, center portion of the debris-intake hood 13 and preferably has a wide, flotation type tire. The two rear casters 32 are located at or near the left and right rear corners of the debris-intake hood 13. The three casters 31 and 32 provide constant ground clearance over unlevel terrain. Rubber or other elastomer skirting 33 surrounds the perimeter of the debris-intake hood 13 and serves to keep debris under the debris-intake hood 13 and prevent leakage into the surrounding ambient areas.

As shown in both dotted and solid line illustration in FIG. 1, the hopper 43 is of high-dump type and is pivoted about pivot 49 on a bracket 100. A hydraulic cylinder 12 is connected between the bracket 100 and the chassis 41 and serves to controllably pivot the hopper 43 about the pivot 49 to an inverted or "dump" position (dotted-line illustration in FIG. 1). As the hopper 43 is raised, the seal interface 15 dis-engages so that the tubes 17 and 30 disconnect and the seal interface 11 likewise disengages from the inlet side of the fan assembly 10. The hopper 43 includes a hinged lid 35 that swings open to allow all debris contained in the hopper 43 to be dumped. When the hopper 43 is returned to its normal position, the lid 35 automatically closes and the seal interfaces 11 and 15 re-engage.

A pivotal tongue and hitch 16 is provided at the rear of the chassis 41 for towing. When the tongue and hitch 16 is swung from its upper, stowed position to its downward position, it can be attached to a suitable towing vehicle. During towing, the rear caster wheel 47 is lifted off the ground or pavement surface and the front drive wheels 46 are disengaged from their respective motors to allow free-wheeling as is known in the art.

The present invention advantageously provides a high maneuverability riding turf sweeper and surface cleaning apparatus well-suited for sweeping turf area with curving and undulating terrain and boundaries.

As will be apparent to those skilled in the art, various changes and modifications may be made to the illustrated high maneuverability riding turf sweeper and surface cleaning apparatus of the present invention without departing from the spirit and scope of the invention as determined in the appended claims and their legal equivalent.

What is claimed is:

1. A high maneuverability surface cleaning apparatus comprising:

a chassis having at least two ground-engaging drive wheels at a forward end thereof and having at least one self-steering caster wheel at the rearward end thereof, said chassis steerable by selective braking of one of said at least two ground-engaging drive wheels;

a debris-receiving hopper mounted on said chassis;

a debris-intake hood mounted forwardly of said ground-engaging drive wheels for picking-up debris from a ground surface in response to an air flow therethrough;

fan means for providing an air flow recirculation loop from said debris-receiving hopper through said debris-intake hood and returning to said hopper.

2. The high maneuverability surface cleaning apparatus of claim 1, further comprising:

a gutter broom mounted on each respective lateral side of said debris-intake hood to sweep debris toward said debris-intake hood.

3. The high maneuverability surface cleaning apparatus of claim 1, wherein said air flow recirculation loop comprises:

a pressure-side hose for conducting air pressurized by said fan means into said debris-intake hood and a suction-side hose for conducting air and any entrained debris from said debris-intake hood.

4. The high maneuverability surface cleaning apparatus of claim 3, wherein said pressure-side hose and said suction-side hose connect to said debris-intake hood on respective lateral sides thereof.

5. The high maneuverability surface cleaning apparatus of claim 4, further comprising:

an operator's seat located between said pressure-side hose and said suction-side hose and located forwardly of said debris-receiving hopper and rearward of said debris-intake hood.

6. The high maneuverability surface cleaning apparatus of claim 1, further comprising:

a self-steering caster wheel located at a forward end of said debris-intake hood intermediate the lateral sides thereof.

7. The high maneuverability surface cleaning apparatus of claim 6, further comprising:

a self-steering caster wheel located at a rear end of said debris-intake hood intermediate the lateral sides thereof..

8. A high maneuverability surface cleaning apparatus comprising:

a chassis having at least two ground-engaging drive wheels at a forward end thereof and having at least one self-steering caster wheel at the rearward end thereof, said chassis steerable by selective braking of one of said at least two ground-engaging drive wheels;

a debris-receiving hopper mounted on said chassis;

a debris-intake hood mounted forwardly of said ground-engaging drive wheels for picking-up debris from a ground surface in response to an air flow therethrough;

fan means for providing an air flow recirculation loop from said debris-receiving hopper through said debris-intake hood and returning to said hopper;

said hopper pivotally mounted at its upper end; and means connected to said hopper for selectively raising said hopper about said pivot to a dumping position whereby the contents of said hopper are dumped therefrom.

9. The high maneuverability surface cleaning apparatus of claim 8, further comprising:

a gutter broom mounted on each respective lateral side of said debris-intake hood to sweep debris toward said debris-intake hood.

10. The high maneuverability surface cleaning apparatus of claim 8, wherein said air flow recirculation loop comprises:

a pressure-side hose for conducting air pressurized by said fan means into said debris-intake hood and a suction-side hose for conducting air and any entrained debris from said debris-intake hood.

11. The high maneuverability surface cleaning apparatus of claim 10, wherein said pressure-side hose and said suction-side hose connect to said debris-intake hood on respective lateral sides thereof.

12. The high maneuverability surface cleaning apparatus of claim 11, further comprising:

an operator's seat located between said pressure-side hose and said suction-side hose and located forwardly of said debris-receiving hopper and rearwardly of said debris-intake hood.

13. The high maneuverability surface cleaning apparatus of claim 8, further comprising:

a self-steering caster wheel located at a forward end of said debris-intake hood intermediate the lateral sides thereof.

14. The high maneuverability surface cleaning apparatus of claim 13, further comprising:

a self-steering caster wheel located at a rear end of said debris-intake hood intermediate the lateral sides thereof.

* * * * *